United States Patent
Zhang et al.

(10) Patent No.: US 8,068,662 B2
(45) Date of Patent: Nov. 29, 2011

(54) METHOD AND SYSTEM FOR DETERMINING A DEFECT DURING CHARGED PARTICLE BEAM INSPECTION OF A SAMPLE

(75) Inventors: Zhao-Li Zhang, San Jose, CA (US); Wei Fang, Milipitas, CA (US); Jack Jau, Los Altos Hills, CA (US)

(73) Assignee: Hermes Microvision, Inc., Hsinchu (TW)

( * ) Notice: Subject to any disclaimer, the term of this patent is extended or adjusted under 35 U.S.C. 154(b) by 425 days.

(21) Appl. No.: 12/414,130

(22) Filed: Mar. 30, 2009

(65) Prior Publication Data

US 2010/0246929 A1 Sep. 30, 2010

(51) Int. Cl.
*G06K 9/00* (2006.01)
(52) U.S. Cl. ........................... 382/141; 250/310
(58) Field of Classification Search .......... 382/141–149; 250/306–311; 356/237.1; 702/183, 121
See application file for complete search history.

(56) References Cited

U.S. PATENT DOCUMENTS

| | | | |
|---|---|---|---|
| 6,252,412 B1 * | 6/2001 | Talbot et al. | 324/754.22 |
| 6,539,106 B1 * | 3/2003 | Gallarda et al. | 382/149 |
| 6,867,606 B2 * | 3/2005 | Pinto et al. | 324/754.21 |
| 7,103,505 B2 * | 9/2006 | Teshima et al. | 702/183 |
| 7,109,483 B2 * | 9/2006 | Nakasuji et al. | 250/310 |
| 7,423,746 B2 * | 9/2008 | Takeda et al. | 356/237.4 |
| 7,474,986 B2 * | 1/2009 | Teshima et al. | 702/183 |
| 7,796,801 B2 * | 9/2010 | Kitamura et al. | 382/141 |
| 7,817,844 B2 * | 10/2010 | Kitamura et al. | 382/141 |
| 7,838,829 B2 * | 11/2010 | Fujisawa et al. | 250/307 |
| 7,842,933 B2 * | 11/2010 | Shur et al. | 250/492.1 |
| 7,956,324 B2 * | 6/2011 | Takahashi et al. | 250/306 |

* cited by examiner

*Primary Examiner* — Layla Lauchman
(74) *Attorney, Agent, or Firm* — Rosenberg, Klein & Lee

(57) ABSTRACT

A method for determining a defect during charged particle beam inspection of a sample locates at least one examination region within a charged particle microscopic image of the sample by making reference to a database graphic of the sample corresponding to the charged particle microscopic image. Each located examination region concerns at least one element of the sample, and each element has at least one characteristic in common. At least one point response value is then generated for each point in the located examination regions. The presence of a defect at the location of the concerned point is then determined by applying at least one decision tree operator to the generated point response values of the concerned point. Applications of the proposed method as a computing agent and a charged particle beam inspection system are also disclosed.

19 Claims, 5 Drawing Sheets

METHOD AND SYSTEM FOR DETERMINING A DEFECT DURING CHARGED PARTICLE BEAM INSPECTION OF A SAMPLE

BACKGROUND OF THE INVENTION

1. Field of the Invention

The present invention relates to a method and application thereof for determining abnormities in a dataset, and more particularly to a method and application thereof for determining a defect from a charged particle microscopic image of a sample.

2. Description of the Prior Art

During charged particle beam inspection of a sample, a charged particle microscopic image is formed from the secondary charged particles released from the sample while it is being bombarded by a primary charged particle beam. By analyzing the charged particle microscopic images, desired information of the physical and electrical characteristics of the inspected sample can be obtained. For example, the charged particle beam imaging technique is applied to the inspection of a semiconductor device, and by analyzing the obtained image of the semiconductor device the presence of defects in the concerned device can be determined.

FIG. 1 schematically illustrates a method for determining a defect during charged particle beam inspection of a sample according to the prior art. First, a charged particle microscopic image 1 is obtained by processing an image data stream extracted from secondary charged particle signals emitted by a sample being inspected. Next, as shown a key-shaped pattern 11a and 12a are identified from image 1. The identification of pattern 11a and 12a is based on certain predefined rules. For example, a rule which defines the shape of data that should contain information of pattern 11a and 12a is selected to be applied for directly identifying such pattern-representing data from the image data stream. Then, the identified patterns 11a, 12a are reproduced in the image and compared with a reference database graphic to determine the presence of a defect (for example label 122 shown in FIG. 1) in patterns 11a and 12a.

The reference database graphic represents a pattern layout corresponding to that in image 1 and can be, for example, a Graphic Data System (GDS) or Open Artwork System Interchange Standard (OASIS), etc. data file of an area on the sample which is represented by image 1. In this embodiment, the reference database graphic contains reference patterns 11b and 12b respectively corresponding to patterns 11a and 12a. As illustrated in FIG. 1, edges 111a and 121a of patterns 11a and 12a are aligned then compared with the corresponding edges 111b and 121b in the reference patterns 11b and 12b for estimating an excursion of the fabricated patterns from the original design. For example, a distance between edges 121a and 121b can be compared for individual point on the edge, or can be compared as a whole through statistical approaches, so as to determine the presence of defect 122. It is noted that in order to distinctly illustrate the idea, an exaggerated shift is shown between patterns 11a, 12a and the corresponding reference pattern 11b and 12b in FIG. 1.

In foregoing prior art, patterns 11a, 12a are identified directly from (the data stream of) image 1 based on certain predefined rules. However, there are difficulties implementing such methodology. For example, some of the rules for identifying the pattern-representing data are more like a guidance of what data sectors to be paid attention to, rather than an exact indicator of the data sectors to be selected. As a result, the identified pattern-representing data could in fact be representing a "false" pattern rather than the real interested one.

According to the foregoing descriptions, the conventional defect determination method for the charged particle beam inspection is not generally reliable. Therefore, a method to more accurately determine a defect from a charged particle microscopic image is desirable.

SUMMARY OF THE INVENTION

Embodiments of the present invention are directed to a method for determining a defect during charged particle beam inspection of a sample and applications thereof. The disclosed method directly locates at least one examination region within the charged particle microscopic image according to the corresponding database graphic of the concerned charged particle microscopic image, and merely determines the defect within the examination region.

In one embodiment, the proposed method for determining a defect during charged particle beam inspection of a sample comprises providing at least one charged particle microscopic image of the sample; aligning each of the charged particle microscopic images with its corresponding database graphic of the sample; locating, within each charged particle microscopic image, at least one examination region by making reference to the corresponding database graphic of the concerned charged particle microscopic image, wherein each of the located examination region concerns at least one element of the sample, and each element has at least one characteristic; generating, for each point in the located examination regions, at least one point response value by collectively processing at least one pixel response value from a predefined neighborhood of the concerned point by using at least one point response evaluator; and determining the presence of a defect at the location of the concerned point in the concerned examination region by applying at least one decision tree operator to the generated point response values of the concerned point.

In another embodiment, a computing agent for determining a defect during charged particle beam inspection of a sample is disclosed. The proposed computing agent comprises an input member and a computing member. The input member is coupled to a charged particle beam microscope system for imaging the sample and thus receives the charged particle microscopic images of the sample therefrom. The computing member is coupled with the input member for receiving the images therefrom. The computing member comprises a computer readable medium encoded with a computer program, wherein the computer program executes steps at least comprises the following: aligning each of the received images with its corresponding database graphic of the sample; locating, within each image, at least one examination region by making reference to corresponding the database graphic, wherein each located examination region concerns at least one element of the sample, and each concerned element has at least one characteristic in common; generating, for each point in the located examination regions, at least one point response value by collectively processing at least one pixel response value from a predefined neighborhood of the concerned point by using at least one point response evaluator; and determining the presence of a defect at the location of the concerned point by applying at least one decision tree operator to the generated point response values of the concerned point.

In yet another embodiment, a charged particle beam inspection system for inspecting a sample is disclosed, which comprises a charged particle beam probe generator, a charged particle beam deflection module, an image forming apparatus, and a defect determination module. The charged particle beam probe generator is used for generating a charged particle beam probe. The charged particle beam deflection module is used for scanning the charged particle beam probe across a surface of the sample. The image forming apparatus is used for detecting the secondary charged particles emitted from the sample being bombarded by the charged particle beam probe, and forming at least one charged particle microscopic image of the sample accordingly. The defect determination module which is encoded with a computer program for determining a defect is coupled to the image forming apparatus, wherein the computer program performs the following steps: retrieving, from the image forming apparatus, at least one charged particle microscopic image of the sample; aligning each of the charged particle microscopic images with its corresponding database graphic of the sample; locating, within each charged particle microscopic image, at least one examination region by making reference to the corresponding database graphic of the concerned charged particle microscopic image, wherein each of the located examination region concerns at least one element of the sample, and each element has at least one characteristic in common; generating, for each point in the located examination regions, at least one point response value by collectively processing at least one pixel response value from a predefined neighborhood of the concerned point by using at least one point response evaluator; and determining the presence of a defect at the location of the concerned point in the concerned examination region by applying at least one decision tree operator to the generated point response values of the concerned point.

The objective, technologies, features and advantages of the present invention will become apparent from the following description in conjunction with the accompanying drawings wherein are set forth, by way of illustration and example, certain embodiments of the present invention.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as following. The described preferred embodiments are presented for purposes of illustration and samples of the present invention, and they are not intended to limit the scope of the present invention.

Figure 1:
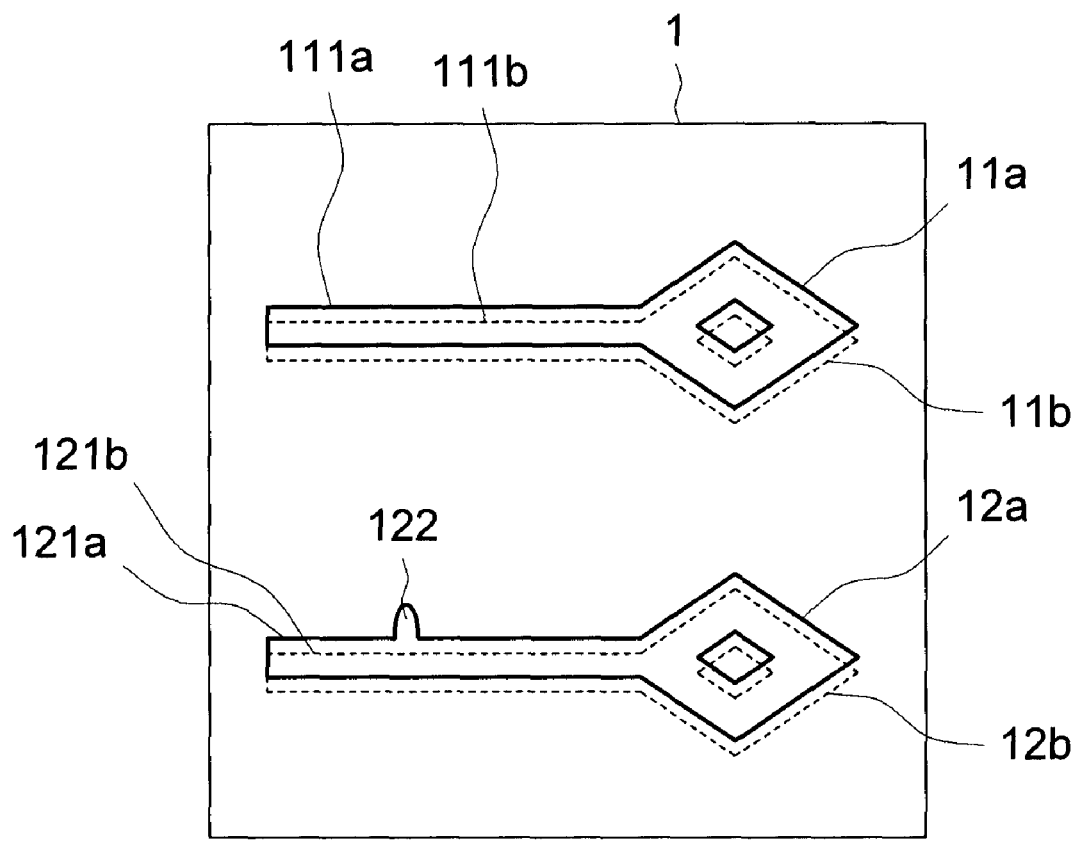
FIG. 1 is a diagram schematically illustrating a method for determining a defect during charged particle beam inspection of a sample according to the prior art.
Figure 2:
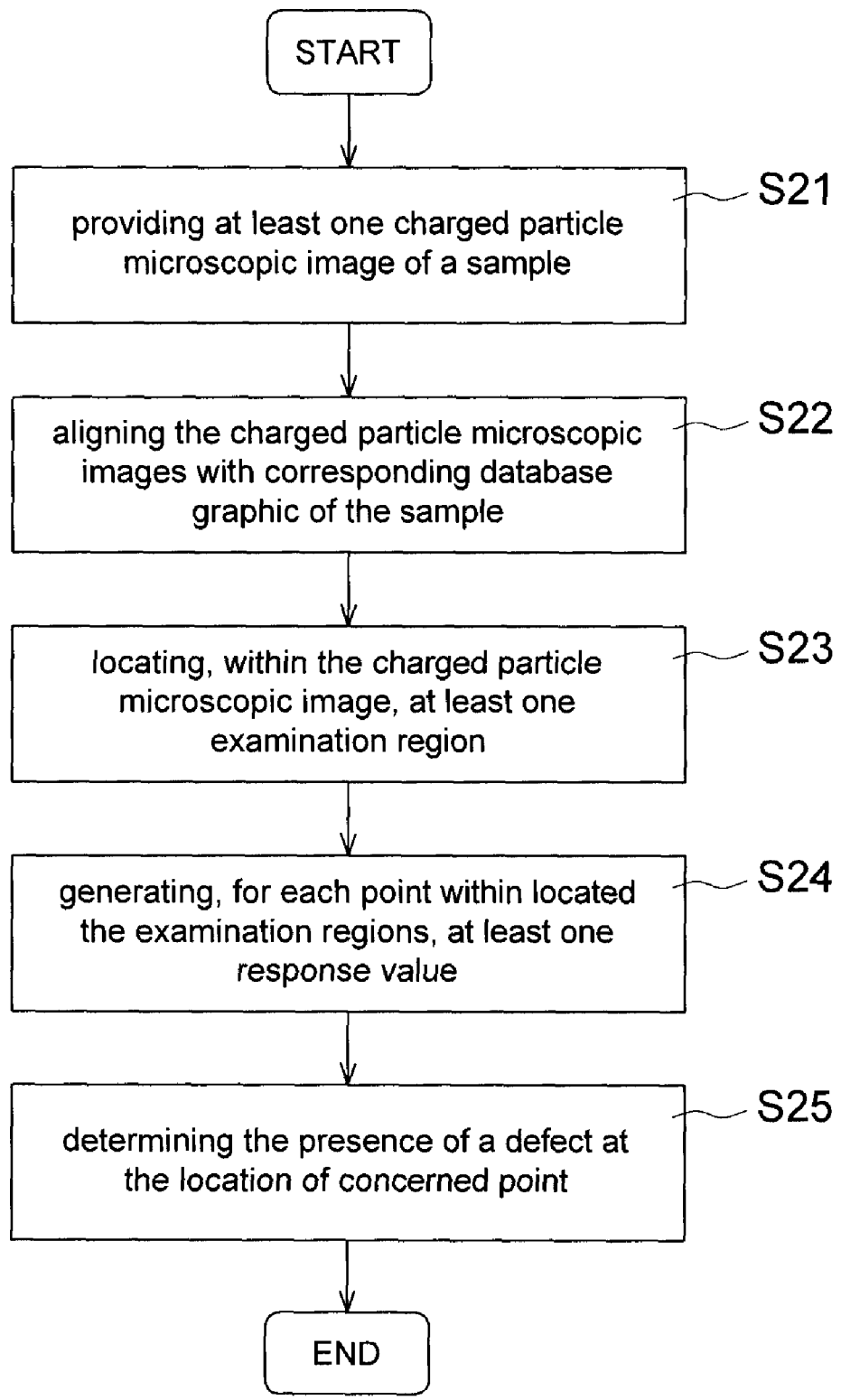
FIG. 2 is a flow chart illustrating a method for determining a defect during charged particle beam inspection of a sample according to an embodiment of the present invention.
Figure 3:
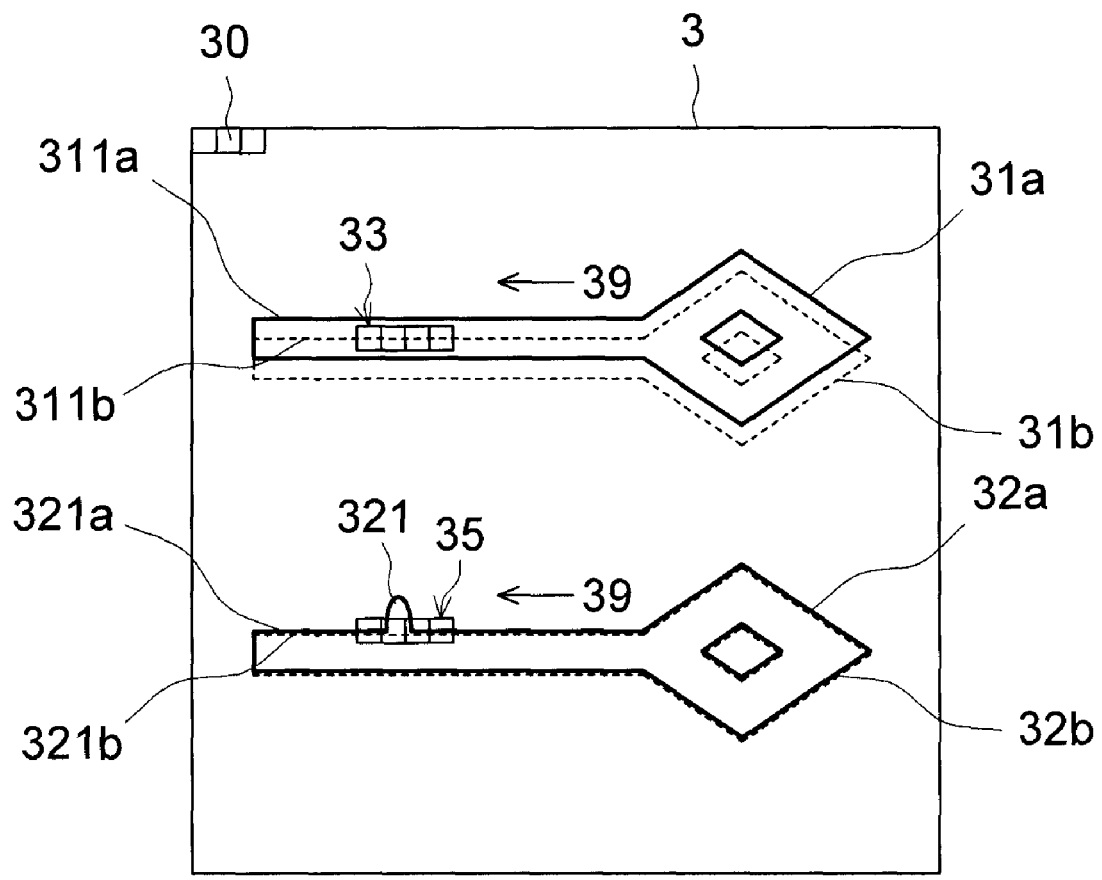
FIG. 3(a) is a diagram schematically illustrating a method for determining a defect during charged particle beam inspection of a sample according to an embodiment of the present invention.
FIG. 3(b) is a diagram schematically illustrating a portion of the method as illustrated in FIG. 3(a)
FIG. 3(c) is a diagram schematically illustrating a portion of the method as illustrated in FIG. 3(a)
Figure 3:
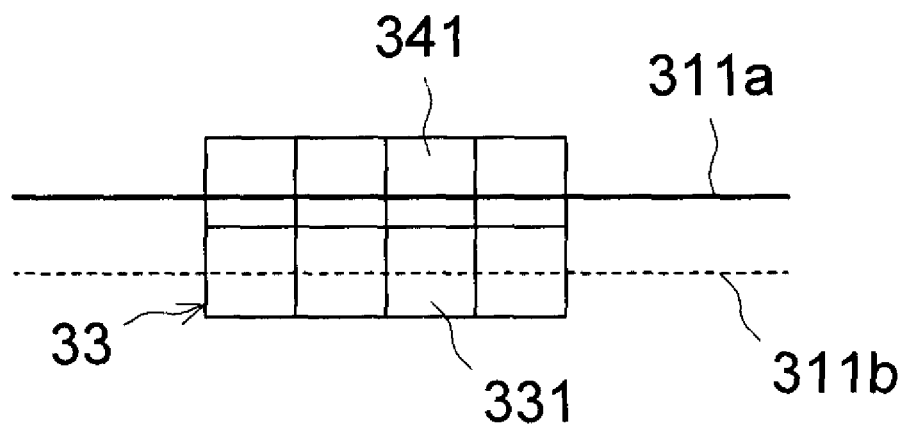
Figure 3:
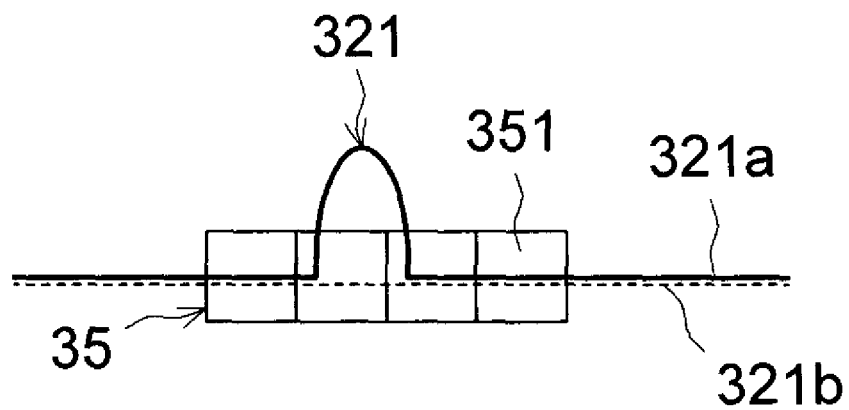

FIG. 2 and FIG. 3 respectively illustrate a method for determining a defect from a charged particle microscopic image of a sample according to an embodiment of the present invention. The sample may be a semiconductor device, such as a wafer, a fabricated chip, a photolithography mask, etc. First, at least one charged particle microscopic image 3 of the sample is provided (step S21), and each of the charged particle microscopic images 3 is aligned with its corresponding database graphic of the sample (step S22). This database graphic may be a GDS (Graphic Data System) file, OASIS (Open Artwork System Interchange Standard) file, etc., or any combination thereof. It should be noted that the charged particle microscopic image 3 may display the structures on a surface of the sample, and/or the structures underneath the sample surface. It is also noted that image 3 is composed of a plurality of pixels 30. It is noted that in order to be able to inspect a sub-pixel defect, pixel 30 maybe obtained by interpolating the original image 3.

Next, for each charged particle microscopic image 3 at least one examination region therein is identified and located by making reference to the database graphic corresponding to charged particle microscopic image 3 (step S23). In one embodiment, this process may be seen as "blindly" exploring the image data stream of image 3 by using, for example, a GDS database graphic of the sample as a map. For example, consider a scenario where an interested element of the sample is to be examined for defects by charged particle beam inspection. First, information of the interested element in the reference database graphic, such as a location coordinate of the points on the interested element, are identified and recorded. Then, the charged particle microscopic image is marked at these exact points indicated by the identified coordinates. These marked points, collectively, are then so referred to as the examination region. It is noted that the examination region is identified and located simply by following a clue from the database graphic. As a result, it may turn out to fall right on the interested element, or in the vicinity of it. In other words, the interested element may locate either within or in the vicinity of an identified and located examination region in the microscopic image being examined.

In the conventional technique, a certain rule may be applied to suggest which data sectors in the image data stream of image 3 contain information of the interested element, for example an interested pattern. However, these rules are not always reliable. For example, some of them may be experience based and not covering all the variants and alternatives of the target pattern, especially in a fast changing environment of IC design. In addition, noises that inevitably exist in the obtained image data stream may also deteriorate the accuracy of the identifying rules.

The method disclosed in this embodiment however, eliminates the pressure to find the correct pattern-representing data sectors. Instead, the disclosed method identifies a location of the interested element in the database graphic, and simply marks the same location in the obtained image data stream as the examination region. In other words, each identified and located examination region within the provided charged particle microscopic image is supposed to concern at least one interested element sought to be examined for defects.

As shown in part (a) of FIG. 3, image 3 comprises interested patterns 31a and 32a (solid line) to be examined for defects. Therefore, at least one examination region 33 for interested pattern 31a, is identified and located by making reference to a database graphic reference pattern 31b (dotted line), and at least one examination region 35 is identified and located by making reference to a database graphic reference patter 32b (dotted line) for interested pattern 32a. As shown in part (b) of FIG. 3, examination region 33, as is for the examination of an interested edge 311a (solid line) of pattern 31a, is at a location indicated by an edge 311b (dotted line) of reference pattern 31b in image 3. It can be seen that examination region 33 is only in the vicinity of interested edge 311a rather than falls right on interested edge 311a. Further, as shown examination region 33 comprises a plurality of examination region pixels 331. As shown in part (c) of FIG. 3, examination region 35, as is for the examination of an interested edge 321a (solid line) of pattern 32a, is at the location of an edge 321b (dotted line) of reference pattern 32b in image 3. It can be seen that examination region 35 falls right on the interested edge 321a. Further, as shown examination region 35 comprises a plurality of examination region pixels 351.

In one embodiment, each interested element selected to be examined may feature at least one characteristic in common. Examples of the element characteristics include the location of the interested element on the sample, the physical property of the interested element, the electrical property of the interested element, specific other elements that the interested element is connected to, the dimension of the interested element, the building material of the interested element, etc., or any combination thereof. As these element characteristics would be obvious for those skilled in the art, only some example descriptions will be given below for a more substantial and enabling disclosure.

For example, when the same element is placed at different locations on a sample, the surrounding elements of it may vary, giving rise to a changed environmental interaction with the concerned element during charged particle beam inspection. This may result in a change in the grey level value of the concerned element's edges as it is sometimes affected by the background grey level value. Another example of the element characteristic is the physical property of an element such as the physical shape or structure. Consider the case of taking a top-view image of a cube. The side walls of the cube thus extend along a direction perpendicular to the image plane. If the side walls are steep, 3 pixels may be sufficient to properly display the grey level value contrast of the side walls in the image. However, for a mildly inclined side wall, 4 or more pixels may be required due to the increased area of the planar projection of that side wall. The electrical property is also an important element characteristic. For example, evaluation of the grey level value contrast of a conducting wire may be different from that of a PN junction. Similar idea applies to the consideration of the materials of which an element is made. In summary, when selecting multiple interested elements for examination, there should be at least one common element characteristic in these elements.

Next, each point within the located examination region 33/35 is evaluated to generate at least one point response value (step S24). The point maybe one single pixel 30, a cluster of it, a sub-pixel of pixel 30, or a cluster of such sub-pixel. In one embodiment, the point response value may be generated by collectively processing (e.g. combining or averaging) a pixel response value from a predefined neighborhood of the concerned point using at least one point response evaluator. For example, when a point of a single pixel 30 is considered, the predefined neighborhood may be selected to be a 3×3 array centered at the concerned point, thus including the concerned point itself and the surrounding 8 pixels of it. The individual point response evaluator may generate at least one point response value for a single concerned point.

In one embodiment, the charged particle image 3 is a voltage contrast image. In such case, the point/pixel grey level value serves as a fundamental point response value which can be used or further processed to generate other forms of point response value such as a gradient vector of the grey level value, a distance between two points for example a distance of the concerned element in the obtained image from its counterpart in corresponding database graphic, grey level curvature of the concerned point for example on an edge, etc. Use of the different forms of point response value may be dependent upon the type of defect being inspected for.

The evaluation of point response value may help improve the tolerance for misalignment of the concerned charged particle microscopic image with the reference database graphic (step S22). For example, as shown in FIG. 3, examination region 35 falls on interested edge 321b i.e. the location of reference edge 321b in the database graphic overlaps with the location of interested edge 321a in image 3. Therefore, examination region pixels 351 encompass interested edge 321a. As a result, the "point" to be evaluated for a response value can be selected to be defined as a single pixel (e.g. examination region pixel 351), and the presence of abnormalities in edge 321a can then be detected by observing variations in the generated point response values.

On the other hand, as also shown in FIG. 3, examination region 33 does not fall on edge 311a. Instead, it locates in the vicinity of edge 311a. In other words, the location of reference edge 3111b in the database graphic shift away from the location of interested edge 311a in image 3. As a result, it is the neighboring pixels 341 rather than the examination region pixels 331 that encompass the interested edge 311a. In such case, if the "point" to be evaluated for a response value is selected to be defined as two consecutive pixels along the vertical direction i.e. one point may comprise an examination region pixel 331 and a neighboring pixel 341, then the presence of abnormalities in edge 311a can still be detected by observing variations in the generated point response value.

In one embodiment, when a point on an interested element is to be evaluated for a point response, the point response evaluator to be used may be selected based on the element characteristics as those described earlier. In an alternative embodiment, another factor to consider for the selection of the point response evaluator is the type of defect which is being inspected for. For example, the defect 321 in pattern 32a shown in FIG. 3 is an extrusion defect which is a physical defect. To examine the presence of this type of defect, the direction of gradient vector of the grey level value may be observed for the concerned points. It is noted that after the examination region has been identified and located with reference to the database graphic, evaluation of point response is performed following a predefined direction. This predefined direction may also be selected with reference to the database graphic. For example, when approaching defect 321 from the right as indicated by arrow 39, the direction of gradient for points in examination region 35 may be pointing upwards (the direction of twelve o'clock). Upon reaching the extrusion defect 321, however, the direction of gradient may change to be at an angle with the direction of twelve o'clock, for example along the direction of two o'clock. Similar principle applies to the examination of a void defect which is also a physical defect. Another example is the particle or pinhole defect. For these two defect types, in addition to the change in gradient direction of the grey level value, the grey level value itself of points in the examination region before and after reaching the defect may change dramatically. For example, if a particle defect occurred at the location of defect 321, when again approaching the particle defect from the right as indicated by arrow 39, the grey level value of points in examination region 35 may look similar until the particle defect is reached.

Other examples include the shift defect where a fabricated edge is formed away from its designated location in the database graphic; the roughness defect where a pattern is fabricated with poor smoothness on its edge; the critical dimension variation defect where the critical dimension of a fabricated pattern is not uniform; the bridge defect where undesired physical connection occurs between two fabricated elements; the missing defect where an element was not fabricated at all by mistake, or the electrical defects such as an open defect, leakage defect or a short defect. Accordingly, for different defect types to be inspected for, a different point response evaluator may be selected to be used.

Reference will now be made back to FIG. 2. Finally, in step S25 at least one decision tree operator is applied to evaluate the generated point response values, so as to determine whether a defect is present at the location of the concerned point within examination region 33/35. For example, by using a statistical tool, a group of point response values may be compared together to determine if, for example, an acceptable average or deviation is obtained. If not, then it may be determined that the examined point is defective.

In one embodiment, the decision tree operator may be selected based on the selected point response evaluator and/or the type of defect being inspected for. For example, the decision tree operator may be implemented as Bayesian statistical method, threshold method, rule-based method, etc., or any combination thereof.

In one embodiment, the decision knowledge, including the decision results and parameters involved in the determination job (such as the element being inspected, the type of defect being inspected for, the selected point response evaluator, its parameters and their values, the selected decision tree operator, its parameters and their values, etc.) may be recorded and then applied to another determination job, such that the knowledge can be passed on and accumulated, thereby more and more improving the determination correctness and accuracy. For example, the knowledge collected in the inspection of an examination region which comprises a complex combination of elements may be recorded and then used to facilitate the inspection of another identical or similar examination region.

In one embodiment, the decision knowledge may be used for the classification of detected defects as well. For example, as mentioned earlier, multiple types and forms of point response value may be generated for one concerned point by one or more point response evaluators. At the end of the inspection of this concerned point (e.g. step S25), the detected defect, if any, is found by matching the behavior of the generated point response values with, for example, a plurality of reference point response value behavior patterns. It is noted that these reference point response value behavior patterns may be experience based. For example, it may be formed from accumulated decision knowledge from previous determination jobs. The point response evaluator generating the matching point response values can then be identified, and as the selection of the point response evaluator to be used is partly or wholly based on the type of defect being inspected for, the type(s) of the found defects can be consequently identified. In one embodiment, this defect type related knowledge may also be part of the decision knowledge to be passed on.

Patterns 31*a*, 32*a* in the charged particle microscopic image 3 may shift away from their designated position in the database graphic due to fabrication inaccuracies or errors. As a result, examination region 33/35, as selected by reference to the database graphic, may locate far away from patterns 31*a*, 32*a*, and covers a blank region where there is no pattern at all. In such case, the analysis result of the point response values may look perfect i.e. no defect seem to be present in examination region 33/35, which in fact is not necessarily true. To avoid this, in one embodiment a plurality of examination regions that comprise identical interested elements and/or identical combination or layout of them may be selected to be examined simultaneously. The points on one interested element are compared against each other and against corresponding points on an interested element located elsewhere on the sample being inspected as well. These compared elements may be within the same image or in different images. In addition, in one embodiment, cross-sample comparison is allowed as well.

The disclosed method for determining defect may be implemented by pure software, pure hard ware, pure firmware, or any combination thereof. For example, the method may be written in a computer program encoded on a computer readable medium, and the computer program is able to execute the details of embodiments described earlier in conjunction with FIG. 2 and FIG. 3. In one embodiment, the method may be coded in an embedded computing device or as part of a data processing system. Or the method can be written in a software application and run on a compatible computing device such as a mainframe host, terminals, personal computers, any kind of mobile computing devices or combination thereof.

It is noted that from a computer program point of view, to implement the aforementioned knowledge-learning feature, step S25 may further comprise generating a decision knowledge signal which stores the decision results and parameters involved in the determination job (such as the element being inspected, the type of defect being inspected for, the selected point response evaluator, its parameters and their values, the selected decision tree operator, its parameters and their values, etc.). This decision knowledge signal may then be passed to a subsequent defect determination job for updating the parameters and their values of a subsequent decision tree operator selected to be used.

It is noted that the proposed method for determining defect from a charged particle microscopic image of a sample, as described in conjunction with FIG. 2 and FIG. 3, can be implemented in the form of a computing agent which is able to communicate with a charged particle beam microscope system forming the concerned charged particle microscopic image. This computing agent can be implemented as a pure hardware such as an independent IC, a firmware or a pure computing program. For example, it can be implemented as a computer readable medium encoded with a computer program, wherein the program is able to execute the details of the proposed method as described in those embodiments in conjunction with FIG. 2 and FIG. 3. In one embodiment, the computing agent may be implemented as the following: a mainframe host, a terminal computer, a personal computer, any kind of mobile computing devices, or any combination thereof.

In one embodiment, this computing agent is implemented to comprise at least an input member, a computing member and an output member. The input member can be coupled to the charged particle beam microscope system for receiving image data streams therefrom. In one embodiment, the input member is coupled to the charged particle beam microscope system through a medium selected from the following: cable wire, optical fiber cable, portable storage media, IR, Bluetooth, human manual input, intranet, internet, wireless network, wireless radio, or any combination thereof. In one embodiment, the computing agent is built in the charged particle beam microscope system. The computing member is coupled with the input member to receive the image data streams from the input member for the use of carrying out the steps/actions described in conjunction with FIG. 2 and FIG. 3.

As described earlier, to perform the disclosed method a reference database graphic of the sample being examined must be available. In one embodiment, the reference database graphic may be inputted by a user through a user input means set on the computing agent. Alternatively, reference database graphic to be used can be picked out from that loaded into the concerned charged particle beam microscope system, for example through a user input means set thereon. Also, a mixture of reference database graphic from both the computing agent and the charged particle beam microscope system may be used simultaneously. In one example, the reference database graphic may be pre-stored in a storage medium set in the computing agent.

As described earlier, at the end of the operation of the computing member the presence of a defect within the examined image(s) will be determined. The output member is coupled to the computing member to receive the determination result, for example in the form of a signal, and then output it for the user's reference.

Figure 4:
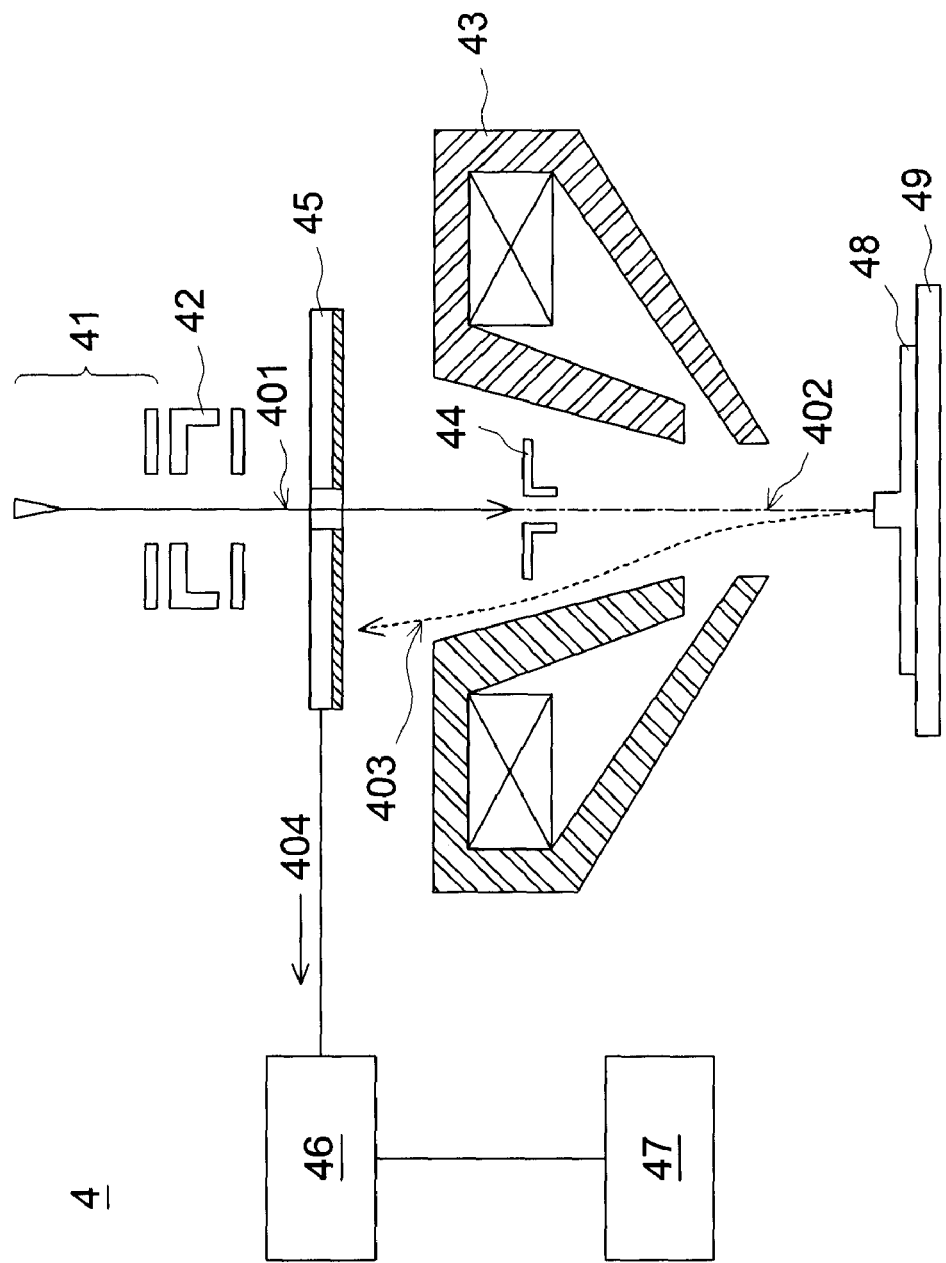
FIG. 4 is a diagram schematically illustrating a charged particle beam inspection system according to an embodiment of the present invention.

Referring to FIG. 4, which illustrates a charged particle beam inspection system 4 according to an embodiment of the present invention. The charged particle beam inspection system 4 is for inspecting a sample 48 on a sample stage 49 and comprises a charged particle beam generator 41, a condenser lens module 42, a probe forming objective lens module 43, a charged particle beam deflection module 44, a secondary charged particle detector module 45, an image forming module 46 and a defect determination module 47. The charged particle beam generator 41 is used for generating a primary charged particle beam 401. The condenser lens module 42 is used for condensing the generated primary charged particle beam 401. The probe forming objective lens module 43 is used for focusing the condensed primary charged particle beam into a charged particle beam probe 402. The charged particle beam deflection module 44 is used for scanning the formed charged particle beam probe 402 across a surface of the sample 48 secured on the sample stage 49. In one embodiment, charged particle beam generator 41, condenser lens module 42 and probe forming objective lens module 43, or their equivalent designs, alternatives or any combination thereof, together form a charged particle beam probe generator which generates the scanning charged particle beam probe 402.

The secondary charged particle detector module 45 is used for detecting secondary charged particles 403 emitted from the sample surface (may also be along with other reflected or scattered charged particles from the sample surface) upon being bombarded by the charged particle beam probe 402 to generate a secondary charged particle detection signal 404. The image forming module 46 is coupled with the secondary charged particle detector module 45 for receiving the secondary charged particle detection signal 404 from the secondary charged particle detector module 45 and forming at least one charged particle microscopic image accordingly. The image forming module 46 may be a mainframe host, terminals, personal computers, any kind of mobile computing devices or combination thereof. In addition, the image forming module 46 may connect the secondary charged particle detector module 45 through a medium selected from the following: cable wire, optical fiber cable, portable storage media, IR, Bluetooth, intranet, internet, wireless network, wireless radio, or any combination thereof. In one embodiment, secondary charged particle detector module 45 and image forming module 46, or their equivalent designs, alternatives or any combination thereof, together form an image forming apparatus which forms a charged particle microscopic image from detected secondary charged particles emitted from sample 48 being bombarded by charged particle beam probe 402.

The above components of a charged particle beam inspection system are well known to those skilled in the art and are not presented here to limit the scope of the present invention. Alternatives, equivalents and modifications of these components should still be within the scope of disclosure of the present invention.

The defect determination module 47 is coupled to the image forming module 46 of the image forming apparatus to determine the presence of a defect within the charged particle microscopic image received from image forming module 46. In one embodiment, the defect determination module 47 connects and accesses the image forming apparatus through a medium selected from the following: cable wire, optical fiber cable, portable storage media, IR, human manual input, Bluetooth, intranet, internet, wireless network, wireless radio, or any combination thereof. Further, the defect determination module 47 may be implemented as one selected from the following: a mainframe host, a terminal computer, a personal computer, any kind of mobile computing devices, or any combination thereof. In one embodiment, a computer program for determining the defect is encoded on a computer readable medium disposed within the defect determination module 47 so that the defect determination module 47 is able to perform the steps of defect determination illustrated in conjunction with FIG. 2 and FIG. 3. It is noted in one embodiment, defect determination module 47 is implemented as the computing agent described earlier.

To summarize the foregoing descriptions, a method and its applications for determining a defect from a charged particle microscopic image of a sample are disclosed in accordance with the embodiments of the present invention. A charged particle beam inspection system capable of performing the disclosed method directly locates at least one examination region within an obtained charged particle microscopic image by making reference to a database graphic corresponding to the concerned charged particle microscopic image. The located examination region at least concerns an interested element to be inspected and may partially or fully encompass the interested element. The examination region could also locate totally away from the interested element. Next, points in the located examination region are evaluated. The evaluation gives rise to a point response for each examined point. These point response values are then analyzed to determine the presence of a defect at the location of the points being examined.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for determining a defect during charged particle beam inspection of a sample, comprising:
    providing at least one charged particle microscopic image of said sample;
    aligning each of said images with its corresponding database graphic of said sample;

locating, within each said image, at least one examination region by making reference to corresponding said database graphic, each located said examination region concerning at least one element of said sample, each concerned said element having at least one characteristic;

generating, for each point in located said examination regions, at least one point response value by collectively processing at least one pixel response value from a predefined neighborhood of concerned said point by using at least one point response evaluator; and determining the presence of a defect at the location of concerned said point by applying at least one decision tree operator to generated said point response values of concerned said point.

2. The method of claim 1, wherein concerned said elements from each located said examination region have at least one characteristic in common.

3. The method of claim 1, wherein said point response evaluator is selected based on said characteristics of concerned said elements and/or the type of said defect being inspected for.

4. The method of claim 1, wherein said characteristics of concerned said elements comprise the location of concerned said element on said sample, the physical property of concerned said element, the electrical property of concerned said element, specific other elements concerned said element is connected to, the dimension of said element, the building material of concerned said element, or any combination thereof.

5. The method of claim 1, wherein said decision tree operator is selected based on selected said point response evaluator and/or the type of said defect being inspected for.

6. The method of claim 1, further comprising generating a decision knowledge which includes information of concerned said element being inspected, the type of said defect being inspected for, selected said point response evaluator, its parameters and their values, selected said decision tree operator, its parameters and their values,
wherein said decision knowledge is passed to a subsequent determining step for updating the parameters and their values for a subsequent said decision tree operator selected to be used.

7. The method of claim 1, wherein said decision tree operator is implemented as Bayesian statistical method, threshold method, rule-based method, or any combination thereof.

8. The method of claim 1, wherein said point response value comprises a grey level value of concerned said point, a grey level value gradient vector of concerned said point, a distance between two concerned said points, grey level curvature of concerned said point, or any combination thereof.

9. The method of claim 1, further comprising classifying determined said defect based on selected said point response evaluator.

10. A computing agent for determining a defect during charged particle beam inspection of a sample, comprising:
an input member coupled to a charged particle beam microscope system for imaging said sample for receiving charged particle microscopic images of said sample therefrom; and
a computing member coupled with said input member for receiving said images therefrom,
wherein said computing member comprises a computer readable medium encoded with a computer program executing steps at least comprising:
aligning each of received said images with its corresponding database graphic of said sample;

locating, within each said image, at least one examination region by making reference to corresponding said database graphic, each located said examination region concerning at least one element of said sample, each concerned said element having at least one characteristic in common;

generating, for each point in located said examination regions, at least one point response value by collectively processing at least one pixel response value from a predefined neighborhood of concerned said point by using at least one point response evaluator; and determining the presence of a defect at the location of concerned said point by applying at least one decision tree operator to generated said point response values of concerned said point.

11. The computing agent of claim 10, wherein said characteristics of concerned said elements comprise the location of concerned said element on said sample, the physical property of concerned said element, the electrical property of concerned said element, specific other elements concerned said element is connected to, the dimension of said element, the building material of concerned said element, or any combination thereof.

12. The computing agent of claim 10, wherein said computer program further executing a step of generating a decision knowledge which includes information of concerned said element being inspected, the type of said defect being inspected for, selected said point response evaluator, its parameters and their values, selected said decision tree operator, its parameters and their values,
wherein said decision knowledge is passed to a subsequent determining step for updating the parameters and their values for a subsequent said decision tree operator selected to be used.

13. The computing agent of claim 10, wherein said computer program further executing a step of classifying determined said defect based on selected said point response evaluator.

14. The computing agent of claim 10, wherein said input member is coupled to said charged particle beam microscope system through a medium selected from the following: cable wire, optical fiber cable, portable storage media, IR, Bluetooth, human manual input, intranet, internet, wireless network, wireless radio, or any combination thereof.

15. A charged particle beam inspection system for inspecting a sample, comprising:
a charged particle beam probe generator for generating a charged particle beam probe;
a charged particle beam deflection module for scanning said charged particle beam probe across a surface of said sample;
an image forming apparatus for detecting secondary charged particles emitted from said sample being bombarded by said charged particle beam probe and forming at least one charged particle microscopic image of said sample accordingly; and
a defect determination module encoded with a computer program for determining the presence of a defect within said image, said defect determination module being coupled with said image forming apparatus, wherein said computer program performs the following steps:
retrieving, from said image forming apparatus, at least one charged particle microscopic image of said sample;
aligning each of said images with its corresponding database graphic of said sample;

locating, within each said image, at least one examination region by making reference to corresponding said database graphic, each located said examination region concerning at least one element of said sample, each concerned said element having at least one characteristic in common;

generating, for each point in located said examination regions, at least one point response value by collectively processing at least one pixel response value from a predefined neighborhood of concerned said point by using at least one point response evaluator; and determining the presence of a defect at the location of concerned said point by applying at least one decision tree operator to generated said point response values of concerned said point.

16. The charged particle beam inspection system of claim 15, wherein said characteristics of concerned said elements comprise the location of concerned said element on said sample, the physical property of concerned said element, the electrical property of concerned said element, specific other elements concerned said element is connected to, the dimension of said element, the building material of concerned said element, or any combination thereof.

17. The charged particle beam inspection system of claim 15, wherein said defect determination module further executing a step of generating a decision knowledge which includes information of concerned said element being inspected, the type of said defect being inspected for, selected said point response evaluator, its parameters and their values, selected said decision tree operator, its parameters and their values, wherein said decision knowledge is passed to a subsequent determining step for updating the parameters and their values for a subsequent said decision tree operator selected to be used.

18. The charged particle beam inspection system of claim 15, wherein said defect determination module further executing a step of classifying determined said defect based on selected said point response evaluator.

19. The charged particle beam inspection system of claim 15, wherein said defect determination module is coupled with said image forming apparatus through a medium selected from the following: cable wire, optical fiber cable, portable storage media, IR, human manual input, Bluetooth, intranet, internet, wireless network, wireless radio, or any combination thereof.

* * * * *